US009491541B2

(12) United States Patent
Breitschaedel et al.

(10) Patent No.: US 9,491,541 B2
(45) Date of Patent: Nov. 8, 2016

(54) SIGNAL PROCESSING FOR ELIMINATING SPEAKER AND ENCLOSURE BUZZ

(71) Applicant: Apple Inc., Cupertino, CA (US)

(72) Inventors: Hannes Breitschaedel, Cupertino, CA (US); Aram M. Lindahl, Menlo Park, CA (US); Justin D. Crosby, Cupertino, CA (US)

(73) Assignee: Apple Inc., Cupertino, CA (US)

(*) Notice: Subject to any disclaimer, the term of this patent is extended or adjusted under 35 U.S.C. 154(b) by 138 days.

(21) Appl. No.: 14/478,363

(22) Filed: Sep. 5, 2014

(65) Prior Publication Data

US 2016/0071504 A1 Mar. 10, 2016

(51) Int. Cl.
*H04B 15/00* (2006.01)
*H04R 3/00* (2006.01)

(52) U.S. Cl.
CPC .................................... *H04R 3/002* (2013.01)

(58) Field of Classification Search
None
See application file for complete search history.

(56) References Cited

U.S. PATENT DOCUMENTS

| | | | |
|---|---|---|---|
| 6,067,362 A | 5/2000 | Lemanski et al. | |
| 8,103,033 B2 | 1/2012 | Drake et al. | |
| 8,611,570 B2 | 12/2013 | Neumeyer et al. | |
| 2012/0002819 A1 | 1/2012 | Thormundsson et al. | |
| 2012/0237045 A1* | 9/2012 | Mihelich | H04R 3/002 381/59 |
| 2013/0242858 A1 | 9/2013 | Amine | |

* cited by examiner

*Primary Examiner* — Muhammad N Edun
(74) *Attorney, Agent, or Firm* — Blakely, Sokoloff, Taylor & Zafman LLP

(57) ABSTRACT

An electronic device for buzz reduction is described. The electronic device is to be used with a speaker driver that is built onto an enclosure and is to be driven by an audio signal which could cause the enclosure to produce buzz. The electronic device includes a filter that is to attenuate a frequency component of the audio signal before driving the speaker driver. The electronic device also includes a controller that is to configure the filter to attenuate the frequency component of the audio signal in response to determining that strength of the audio signal at the frequency component exceeds a threshold. Other embodiments are also described and claimed.

17 Claims, 8 Drawing Sheets

SIGNAL PROCESSING FOR ELIMINATING SPEAKER AND ENCLOSURE BUZZ

FIELD

An embodiment of the invention is related to digital audio signal processing techniques, and particularly to techniques for eliminating speaker and enclosure buzz.

BACKGROUND

In a product, speaker drivers are typically combined with enclosures. For example a wide range of electronic devices, such as desktop computer, laptop computer, tablet, and smartphone, have built-in speaker drivers. A driver may as well be mounted onto its own dedicated cabinet box, creating a standalone speaker product. Examples for this are the typical Hi-Fi or stereo loudspeakers which are part of a home Hi-Fi system or professional sound reinforcement systems typically used in concert venues. Other examples of drivers which are mounted onto enclosures are headphones, car stereo systems, and TV screens.

Buzzing sounds caused by the enclosure, the driver itself or a combination of the two is a common issue that arises when the driver is operating at considerable levels. In this disclosure, a "buzz" is considered to be an acoustic disturbance that is produced in large part due to a resonating mechanical component. The resonance is excited by an audio signal. When the resonance frequency of a mechanical component matches with an audio frequency component in the audio signal, the mechanical component experiences its largest amplitude of vibration. If the amplitude is large enough to cause one vibrating mechanical component to touch another component, a buzzing sound is produced. Additionally, even without a component actually touching other components, a component can emit a buzz which is simply caused by high-energy excitation that produces sound.

In a simplified model, music can be viewed as a sequence of harmonic partial tones. A harmonic partial tone of an audio signal is a frequency component of the audio signal that is an integer multiple of the fundamental frequency. For example, if the fundamental frequency is f, the harmonic partial tones have frequencies 2f, 3f, 4f . . . etc. The partial tones change over time with respect to their count, level and frequency. The majority of the energy of a musical signal is stored in its partial tones. This also holds for speech and animal sounds. Concentrating the energy of a communication signal (such as speech, music or animal sounds) into a few partial tones rather than spreading it over a large number of partial tones or a wider frequency spectrum is an energy efficient method of delivering a message across a noisy environment. In this disclosure, the terms "harmonic partial tone" and "partial tone" are used interchangeably.

In the case where music, speech or the like is being played back over a driver which is mounted on an enclosure whose structural resonances match with partial tones and the sound playback level is beyond a certain threshold, buzz is created. A buzz can however be masked by other components of the audio signal in which case they are not audible to a human being and therefore of little concern. On the other hand, if not masked, buzzes are very annoying.

A traditional way of mitigating the buzz problem is to apply changes to the physical structure of the enclosure. There are limits imposed by unit cost, weight, and product design however, often rendering a complete physical modifications-based elimination of buzzes unfeasible. If buzzes cannot be eliminated by the physical design, an audio signal processing approach referred to as equalization is commonly used, to reduce the levels of the frequency ranges that cause buzz.

SUMMARY

A major drawback of the equalizer approach is that the equalizer is static and therefore also affects the sonic quality of any audio which either does not contain the frequency components that would actually cause a buzz or is not at a high enough level. For example, when listening at low levels, buzz is unlikely to occur but the audio is nevertheless altered by the equalizer, which is unnecessary, costly, and can degrade the quality of audio.

An electronic device for buzz reduction is described. The electronic device is to be used with a speaker driver that is built onto an enclosure and is to be driven by an audio signal which could cause the enclosure to produce buzz. The electronic device includes a filter that is to attenuate a frequency component of the audio signal before driving the speaker driver. The electronic device also includes a controller that is to configure the filter to attenuate the frequency component of the audio signal in response to determining that strength of the audio signal at the frequency component exceeds a threshold.

In one embodiment, the electronic device further includes a gain stage that is to apply a user preference volume level to the audio signal. The controller and the filter are parts of a buzz reduction module. The buzz reduction module is to process the audio signal after the gain stage applies the user preference volume level to the audio signal. The controller is to determine that the strength of the audio signal at the frequency component exceeds the threshold based on the audio signal that has been applied the user preference volume level. In one embodiment, the electronic device further includes a power amplifier that is to amplify the audio signal to a level suitable for driving the speaker driver. The power amplifier is to amplify the audio signal after the audio signal is processed by the buzz reduction module.

The electronic device of one embodiment further includes a forward fast Fourier transform (FFT) block that is to transform the audio signal from time domain to frequency domain to be analyzed by the controller. The filter attenuates the frequency component of the audio signal in the time domain. In one embodiment, the filter attenuates the frequency component of the audio signal in an amount that is determined by how much the strength of the audio signal at the frequency component exceeds the threshold. In one embodiment, the filter is part of a filter bank. The frequency component of the audio signal is within a frequency band. Each filter of the filter bank processes a respective frequency band. In one embodiment, the filter is a parametric filter. In one embodiment, the filter attenuates only the frequency component, not a surrounding band of the frequency component. In one embodiment, the filter is idle when the strength of the audio signal at the frequency component does not exceed the threshold. The filter can be switched off when idle. The filter is to output exactly equals input when idle.

A method of buzz reduction for an electronic device is described. An embodiment of the method detects that strength of a partial tone of an audio signal exceeds a threshold. A filter is configured to attenuate the partial tone to a level below the threshold. The configured filter is applied to the audio signal. The audio signal is sent to a power amplifier after applying the filter. In one embodiment, the method applies a user preference volume level to the audio signal before the detecting. In one embodiment, the method further configures a set of filters to attenuate a set of partial tones that are integer multiples of the partial tone In one embodiment, different partial tones have different thresholds. The method of one embodiment transforms the audio signal from time domain to frequency domain by performing forward FFT on the audio signal. In one embodiment, the detecting is in the frequency domain and the applying of the filter to the audio signal is in the time domain. In one embodiment, the filter attenuates only the partial tone, not the frequency band surrounding the partial tone. In one embodiment, the partial tone is attenuated in an amount that is determined by how much the partial tone exceeds the threshold.

The above summary does not include an exhaustive list of all aspects of the invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The present invention is illustrated by way of example and not limitation in the figures of the accompanying drawings in which like references indicate similar elements.

DETAILED DESCRIPTION

An electronic device for buzz reduction is described. In the following description, numerous specific details are set forth to provide thorough explanation of embodiments of the invention. It will be apparent, however, to one skilled in the art, that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

Figure 1:
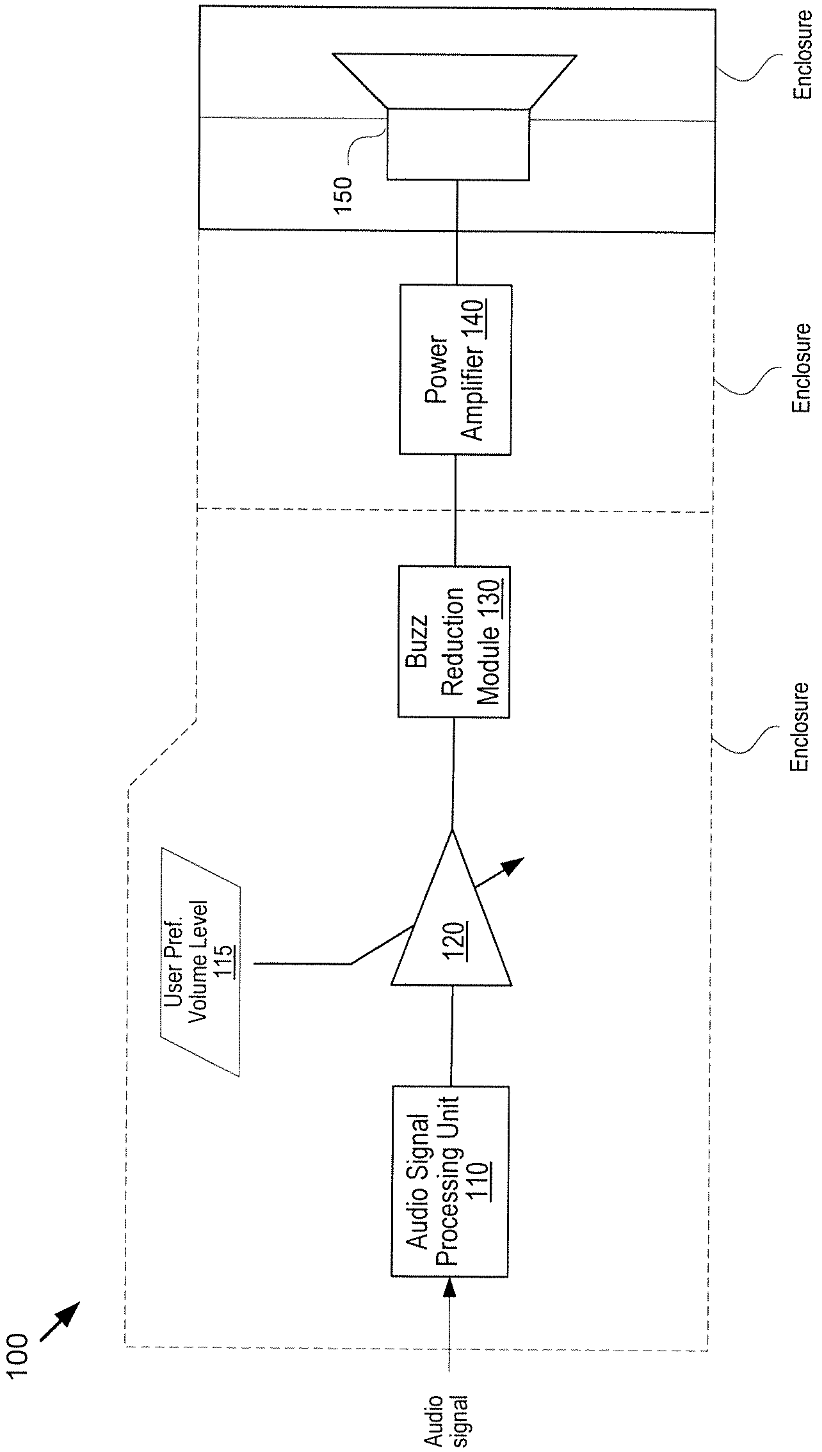
FIG. 1 illustrates a block diagram of a device of one embodiment that reduces buzz.

FIG. 1 illustrates a block diagram of a device 100 of one embodiment that reduces buzz. In one embodiment, the device 100 is part of an audio system that is combined with an enclosure. As illustrated in FIG. 1, the device 100 includes an audio signal processing unit 110, a gain stage 120, a buzz reduction module 130, a power amplifier 140, and a speaker 150.

The audio signal processing unit 110 receives the input audio signal and performs audio signal processing on the input audio signal. The processed audio signal is fed to a gain stage 120. The gain stage 120 applies a gain to the audio signal based on a user preference volume level 115. The user preference volume level 115 is determined by the user and may be within a volume range (e.g., 0-16 or 0.0-1.0), where the floor of the volume range represents the minimum volume and the ceiling of the volume range represents the full volume.

The buzz reduction module 130 receives the audio signal outputted by the gain stage 120. The buzz reduction module 130 reduces buzz that may be caused by the audio signal by limiting partial tones to an amplitude threshold. In one embodiment, the buzz reduction module 130 reduces buzz by using an array of parametric filters, which are automatically set to the appropriate frequency, gain, and quality at the right moment. Different embodiments of the buzz reduction module 130 will be further described in FIGS. 5-8 below. After being processed by the buzz reduction module 130, the audio signal may then be passed to the power amplifier 140 that is driving the speaker 150.

The device 100 was described above for one embodiment of the invention. One of ordinary skill in the art will realize that in other embodiments, this module can be implemented differently. For instance, in one embodiment described above, certain modules are implemented as software modules for example to be executed by an application processor or a system-on-chip (SoC). However, in another embodiment, some or all of the modules might be implemented by hardware or programmable logic gates, which can be dedicated application specific hardware (e.g., an ASIC chip or component) or a general purpose chip (e.g., a microprocessor or FPGA).

Figure 2:
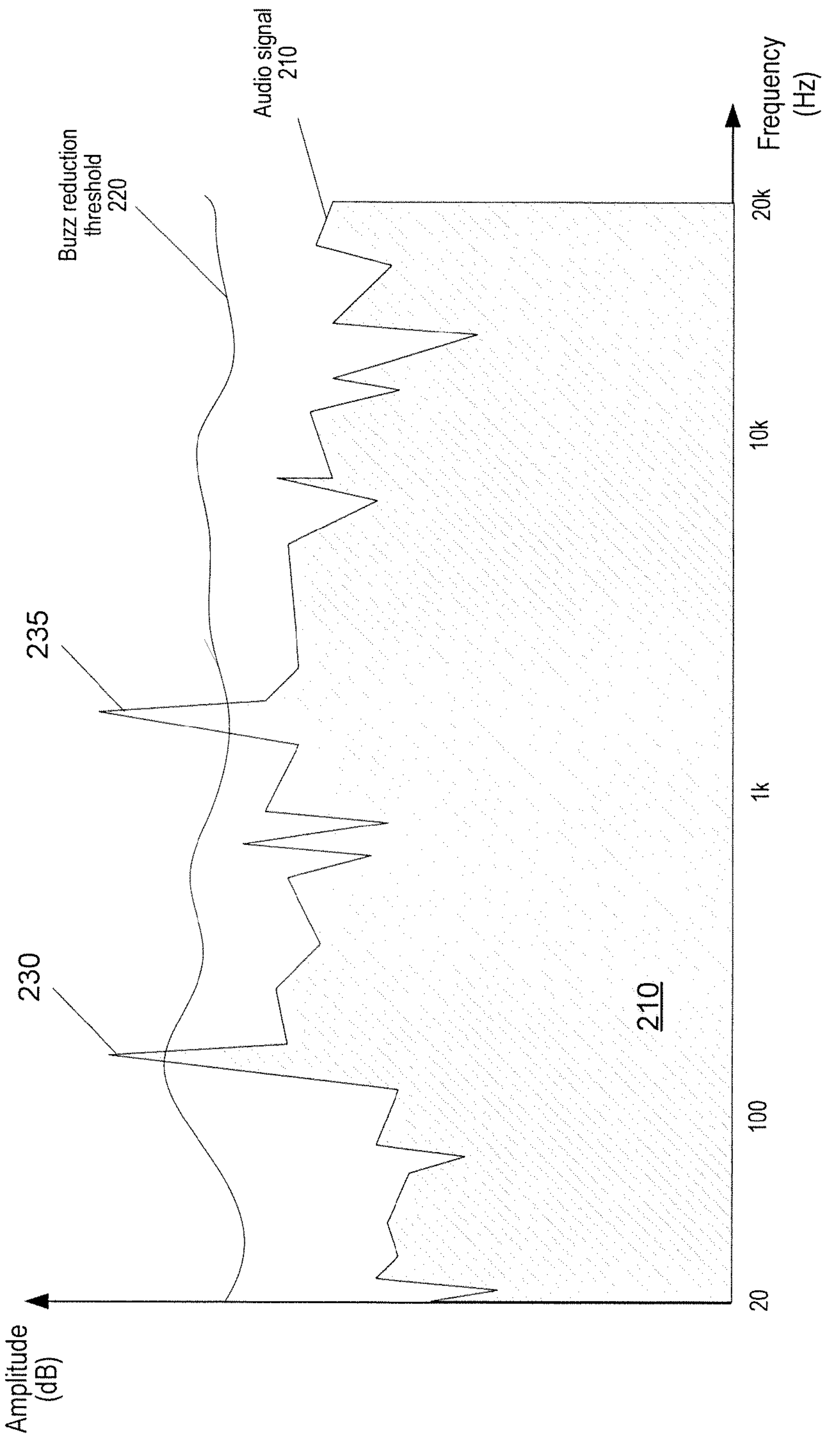
FIG. 2 illustrates an example of a scenario that may cause buzz.

FIG. 2 illustrates an example of a scenario that may cause buzz. As shown in FIG. 2, the shaded area 210 is an audio signal in the frequency domain covering the audible range from typically 20 Hz-20 kHz. The curved line 220 from left to right is the buzz reduction threshold curve. The buzz reduction threshold curve 220 is device dependent. That is, different devices could have different buzz reduction threshold curves. In one embodiment, one device may use multiple buzz reduction threshold curves. In one embodiment, the buzz reduction threshold curve 220 is set as high as possible, but making sure that buzzes are not audible if the audio signal does not exceeds the buzz reduction threshold curve.

There are two peaks 230 and 235 of the audio signal 210 that exceeds the buzz reduction threshold curve 220. The peak 230 is at about 200 Hz and the peak 235 is at about 3 kHz. Because peaks 230 and 235 exceed the buzz reduction threshold curve 220, the audio signal 210 is likely to cause buzz in a product that combines speaker drivers with enclosures.

Figure 3:
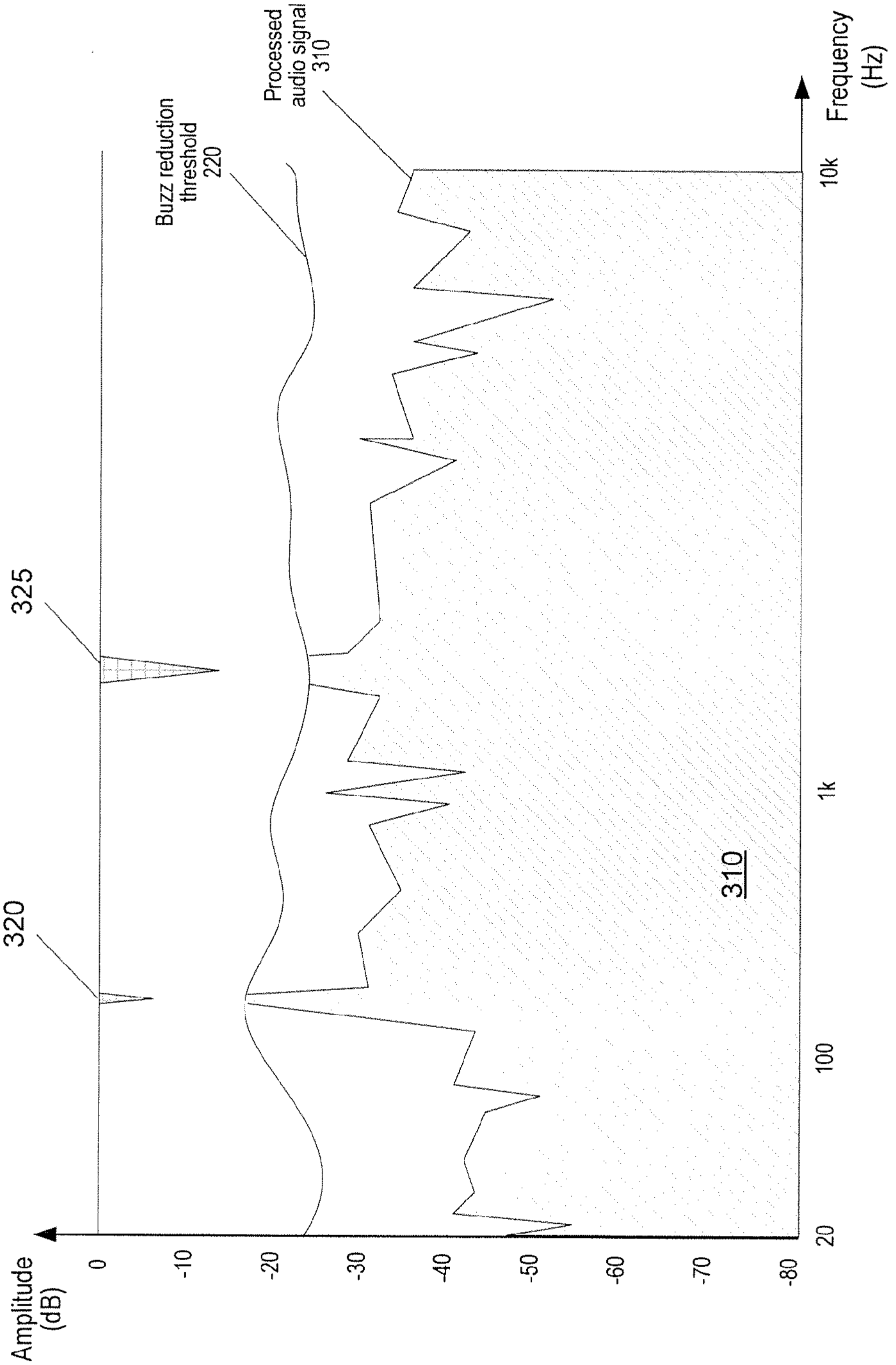
FIG. 3 illustrates an example effect after using one embodiment of the present disclosure to reduce buzz.

FIG. 3 illustrates an example effect after using one embodiment of the present disclosure to reduce buzz. In one embodiment, the device 100 described in FIG. 1 above is used to process the audio signal 210 described in relation to FIG. 2 above to reduce buzz. In one embodiment, partial tones are limited to an amplitude threshold by an array of adaptive parametric filters, which are automatically set to the appropriate frequency, gain, and quality at the right moment.

As shown in FIG. 3, two parametric filters 320 and 325 operates at 200 Hz and 3 kHz, respectively, to reduce partial tones by 6 dB and 14 dB. The shaded area 310 is the audio signal 210 described in relation to FIG. 2 above after buzz reduction by parametric filters 320 and 325. The curved line 220 from left to right is the buzz reduction threshold curve. Because the processed audio signal 310 does not exceed the buzz reduction threshold curve 220, it is unlikely to cause any buzz.

The audio signal is only altered by a parametric filter in the moment where a buzz would otherwise be excited. This ensures unaltered audio signal in all the other cases, for example, while listening at a low playback volume level. Listening at very high volume levels rarely occurs and with the proposed invention in operation, the majority of the time, when listening at low volume levels, the audio signal can remain unchanged. This is in contrast to using a fixed equalizer, by which the audio signal is altered even when listening at very low volume levels.

Figure 4:
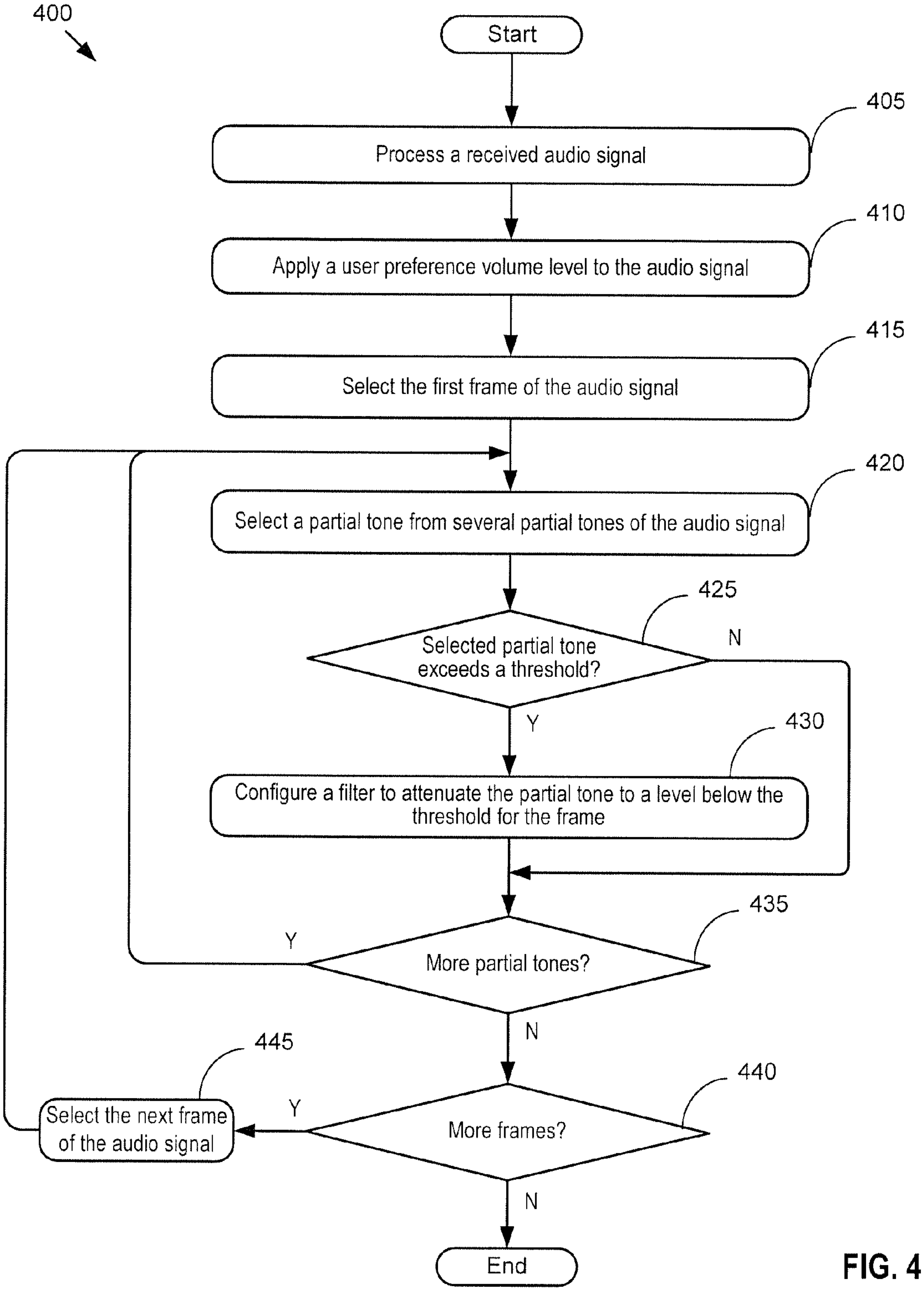
FIG. 4 illustrates a flowchart of operations performed in a device for reducing buzz.

FIG. 4 illustrates a flowchart of operations performed in a device for reducing buzz, referred to as process 400. In one embodiment, the device 100 of FIG. 1 executes process 400 when an input audio signal is received. As illustrated in FIG. 4, process 400 begins by processing (at block 405) a received audio signal. In one embodiment, the audio signal processing unit 110 described in relation to FIG. 1 above performs this operation.

At block 410, process 400 applies a user preference volume level to the audio signal. In one embodiment, the gain stage 120 described in FIG. 1 above performs this operation. At block 415, process 400 selects the first frame of the audio signal. Process 400 selects (at block 420) a partial tone from several partial tones of the audio signal. In one embodiment, a partial tone is a frequency component of the audio signal.

Process 400 determines (at block 425) whether the selected partial tone exceeds a threshold. In one embodiment, the threshold is the value of a point corresponding to the selected partial tone on the buzz reduction threshold curve 220 described in relation to FIGS. 2 and 3 above. If the selected partial tone does not exceed the threshold, process 400 proceeds to block 435.

If the selected partial tone exceeds the threshold, process 400 configures (at block 430) a filter to attenuate the partial tone to a level below the threshold for the frame of the audio signal. The amount of attenuation on the partial tone by the filter is determined by how much the selected partial tone exceeds the threshold. In one embodiment, the filter is a parametric filter with high Q. In another embodiment, the filter can be a gain stage that applies a gain to attenuate the partial tone. In yet another embodiment, the filter can be a filter bank. In yet another embodiment, the filter can be a filter bank and per filter channel limiters. In one embodiment, in addition to attenuate the selected partial tone, process 400 configures filters to attenuate partial tones that are integer multiples of the selected partial tone.

At block 435, process 400 determines whether there are more partial tones need to be processed. If there are more partial tones need to be processed, process 400 loops back to block 420 to select another partial tone from the partial tones of the audio signal. If there is no more partial tone, process 400 proceeds to block 440.

At block 440, process 400 determines whether there are more frames of the audio signal need to be processed. If there are more frames, process 400 selects (at block 445) the next frame of the audio signal. Process 400 then loops back to block 420 to process the selected frame. If there is no more frame, process 400 ends. In one embodiment, the buzz reduction module 130 described in relation to FIG. 1 above performs the operations of blocks 415-445.

One of ordinary skill in the art will recognize that process 400 is a conceptual representation of the operations executed by a buzz reduction device. The specific operations of process 400 may not be performed in the exact order shown and described. The specific operations may not be performed in one continuous series of operations, and different specific operations may be performed in different embodiments. Furthermore, process 400 could be implemented using several sub-processes, or as part of a larger macro process.

Figure 5:
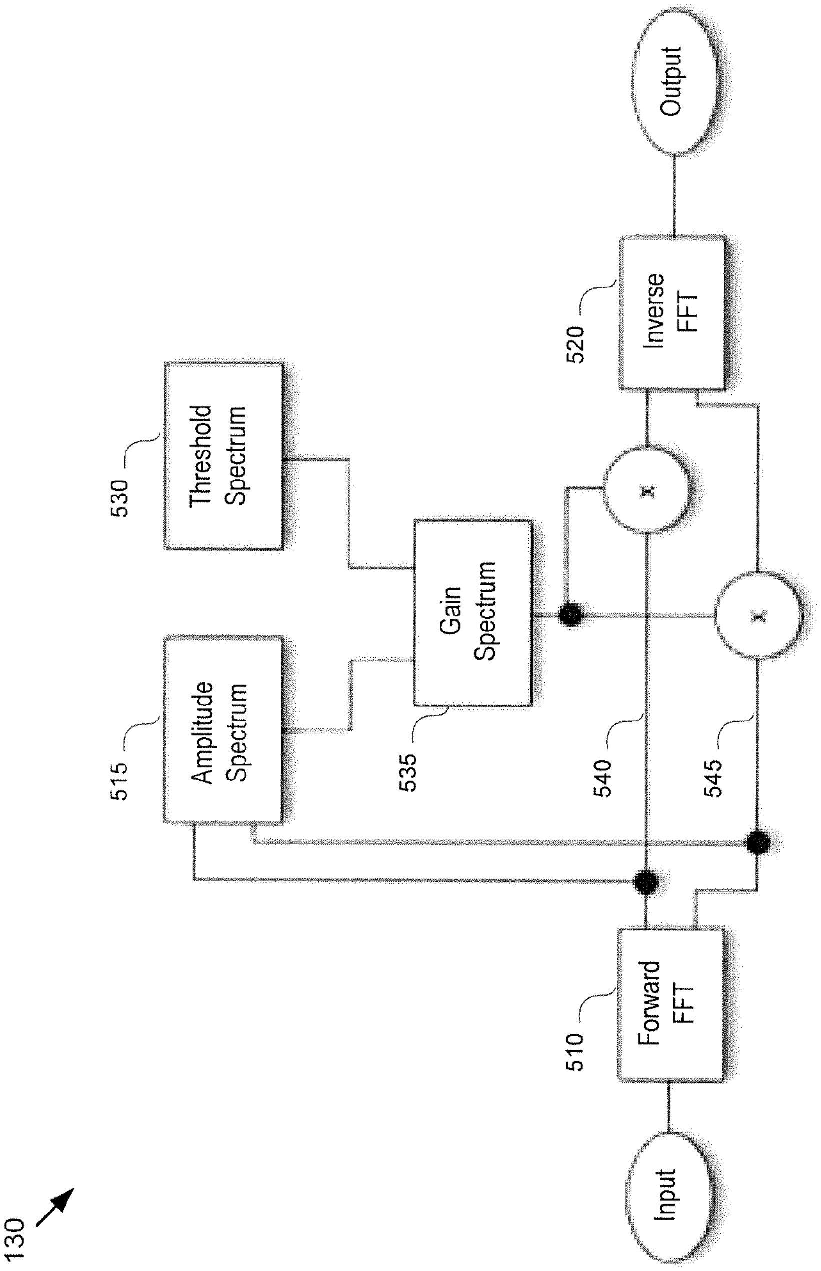
FIG. 5 illustrates a block diagram of a buzz reduction module of one embodiment that uses fast Fourier transform.

The present disclosure describes several signal processing algorithms, each of which limits the amplitude of partial tones so that they do not excite buzz, but leave the audio signal unaltered in the case where no partial tones exceed a threshold. FIG. 5 illustrates a block diagram of a buzz reduction module 130 of one embodiment that uses FFT. In one embodiment, the buzz reduction module 130 is part of the device 100 described in FIG. 1 above. As illustrated in FIG. 5, the buzz reduction module 130 includes a forward FFT block 510 and an inverse FFT block 520.

The forward FFT block 510 transforms the input audio signal to the frequency domain using any standard FFT method. Buzz reduction of the audio signal is done in the frequency domain. Once the buzz reduction of the audio signal is completed, the inverse FFT block 520 transforms the resulting audio signal back to the time domain. In one embodiment, a 75% overlap-add and a Hanning window are used to avoid FFT block processing based sound artifacts.

The forward FFT block 510 receives the input audio signal and outputs an amplitude spectrum 515. The amplitude spectrum 515 includes a real part 540 and an imaginary part 545. Buzz reduction of the audio signal in the frequency domain comprises comparing the amplitude of the partial tones (in the amplitude spectrum 515) against thresholds in the threshold spectrum 530 and computing a gain for each partial tone. For each partial tone, the gain is determined by the amount of which the partial tone amplitude is greater than the threshold for the partial tone. If the partial tone amplitude is less than or equal to the threshold for the partial tone, the gain will be zero. The resulting gain spectrum 535 is then applied to the real part 540 and imaginary part 545 of the amplitude spectrum 515. In one embodiment, the amplitude spectrum 515 is the audio signal 210 described in FIG. 2 above. In one embodiment, the threshold spectrum 530 is the buzz reduction threshold curve 220 described in relation to FIGS. 2 and 3 above.

The benefits of the buzz reduction module 130 as illustrated in FIG. 5 lie in the fact that it is a very robust algorithm which is stable and predictable under any circumstance. It is also cheap in terms of CPU usage and very simple to implement.

The buzz reduction module 130 was described above for one embodiment of the invention. One of ordinary skill in the art will realize that in other embodiments, this module can be implemented differently. For instance, in one embodiment described above, certain modules are implemented as software modules for example to be executed by an application processor or a system-on-chip (SoC). However, in another embodiment, some or all of the modules might be implemented by hardware or programmable logic gates, which can be dedicated application specific hardware (e.g., an ASIC chip or component) or a general purpose chip (e.g., a microprocessor or FPGA).

Figure 6:
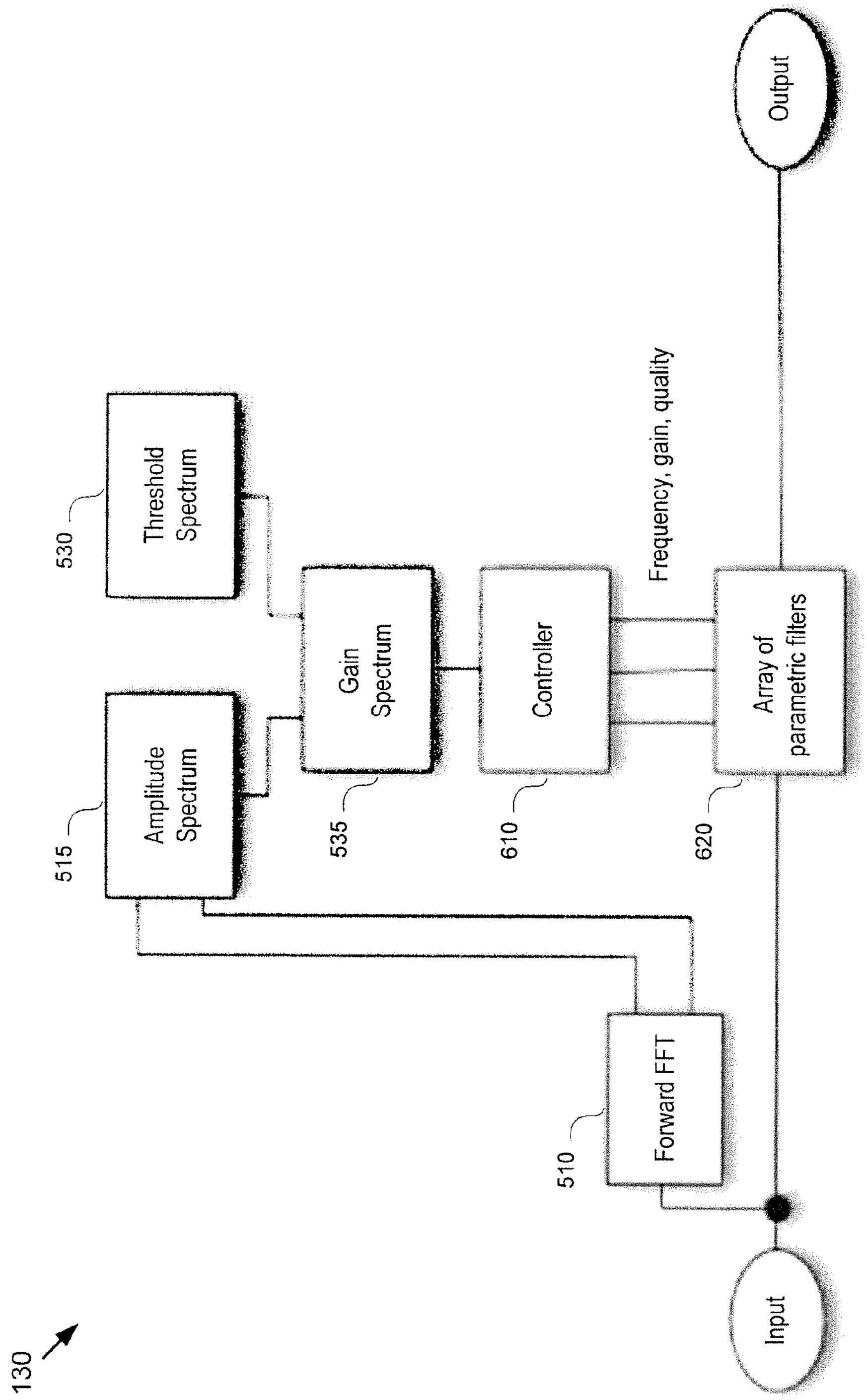
FIG. 6 illustrates a block diagram of a buzz reduction module of one embodiment that uses a fast Fourier transform controlled parametric filter array.

FIG. 6 illustrates a block diagram of a buzz reduction module 130 of one embodiment that uses a FFT controlled parametric filter array. In one embodiment, the buzz reduction module 130 is part of the device 100 described in FIG. 1 above. As illustrated in FIG. 6, the buzz reduction module 130 includes a forward FFT block 510, a controller 610, and an array of parametric filters 620. In one embodiment, each parametric filter in the array of parametric filters 620 is a high Q parametric filter.

The forward FFT block 510 transforms the input audio signal to the frequency domain using any standard FFT method. The forward FFT block 510 receives the input audio signal and outputs an amplitude spectrum 515. The amplitude of the partial tones (in the amplitude spectrum 515) is compared against thresholds in the threshold spectrum 530 and a gain is computed for each partial tone. For each partial tone, the gain is determined by the amount of which the partial tone amplitude is greater than the threshold for the partial tone. If the partial tone amplitude is less than or equal to the threshold for the partial tone, the gain will be zero. The resulting gain spectrum 535 is then sent to the controller 610. In one embodiment, the amplitude spectrum 515 is the audio signal 210 described in FIG. 2 above. In one embodiment, the threshold spectrum 530 is the buzz reduction threshold curve 220 described in relation to FIGS. 2 and 3 above. The controller 610 controls the array of parametric filters 620 to attenuate the audio signal in certain partial tones when there are non-zero gains in the gain spectrum 535 for those partial tones.

As illustrated in FIG. 6, buzz reduction of the audio signal is done in the time domain. The transformation of the audio signal to the frequency domain facilitates a comparison of the audio signal to the buzz reduction threshold curve. The result of the comparison is provided to the controller 610 so that the controller can control the array of parametric filters 620 to perform buzz reduction of the audio signal in the time domain. The latency of the buzz reduction module 130 is determined by the array of parametric filters 620. Therefore, the latency of the buzz reduction module 130 is zero while the array of parametric filters 620 is idle. Notably, the array of parametric filters 620, when idle, is designed in a way that output exactly equals input.

The buzz reduction module 130 as illustrated in FIG. 6 has the advantage of being able to support real-time applications, because it introduces no latency when the array of parametric filters 620 is idle. It comes at the cost of a slightly higher CPU load and a risk of becoming unstable, because of the more complex nature of the controller algorithm.

When idle, the array of parametric filters 620 and parts of the controller 610 can be switched off. This results in considerable CPU savings.

The buzz reduction module 130 was described above for one embodiment of the invention. One of ordinary skill in the art will realize that in other embodiments, this module can be implemented differently. For instance, in one embodiment described above, certain modules are implemented as software modules for example to be executed by an application processor or a system-on-chip (SoC). However, in another embodiment, some or all of the modules might be implemented by hardware or programmable logic gates, which can be dedicated application specific hardware (e.g., an ASIC chip or component) or a general purpose chip (e.g., a microprocessor or FPGA).

Figure 7:
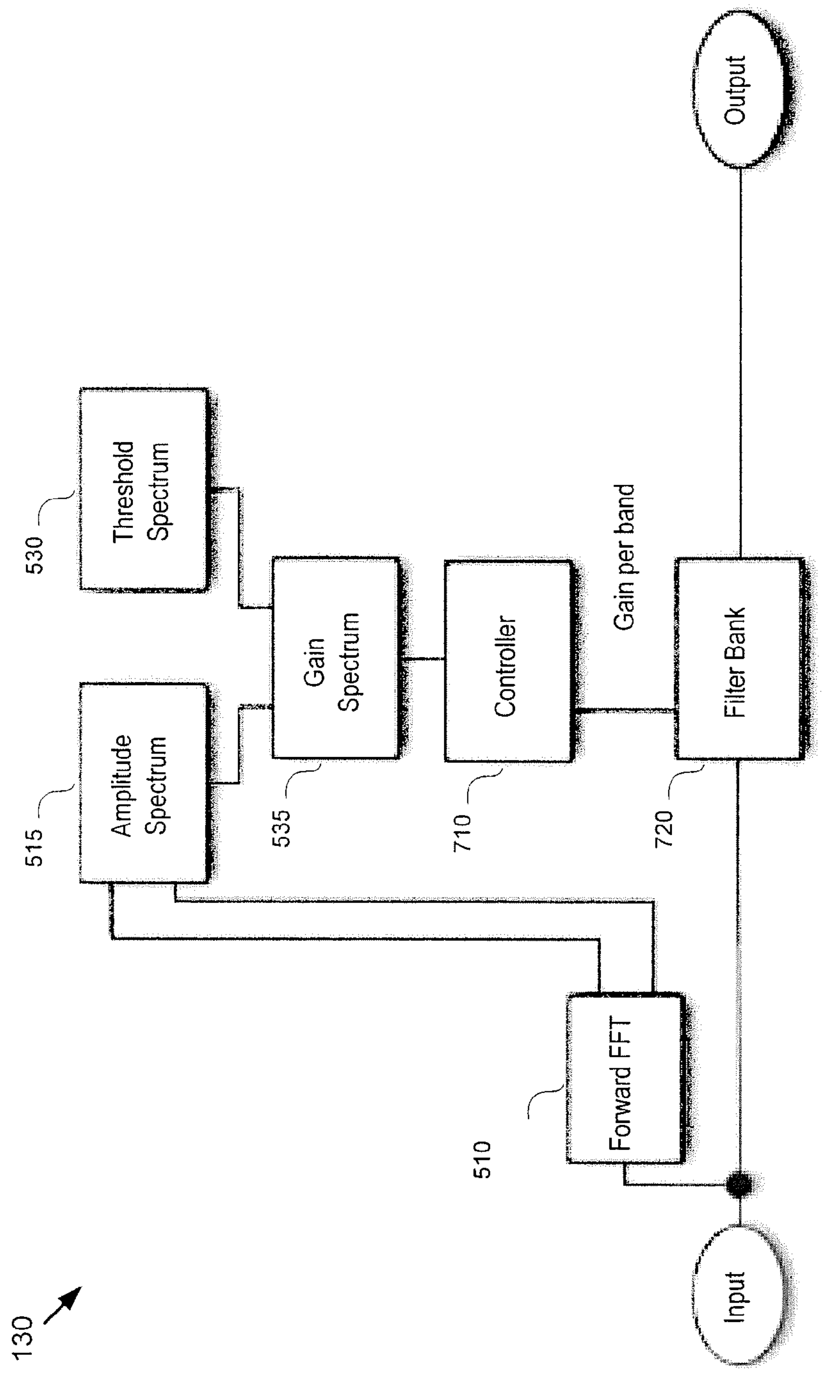
FIG. 7 illustrates a block diagram of a buzz reduction module of one embodiment that uses a fast Fourier transform controlled filter bank.

FIG. 7 illustrates a block diagram of a buzz reduction module 130 of one embodiment that uses a FFT controlled filter bank. In one embodiment, the buzz reduction module 130 is part of the device 100 described in FIG. 1 above. As illustrated in FIG. 7, the buzz reduction module 130 includes a forward FFT block 510, a controller 710, and a filter bank 720.

The forward FFT block 510 transforms the input audio signal to the frequency domain using any standard FFT method. The forward FFT block 510 receives the input audio signal and outputs an amplitude spectrum 515. The amplitude of the partial tones (in the amplitude spectrum 515) is compared against thresholds in the threshold spectrum 530 and a gain is computed for each partial tone. For each partial tone, the gain is determined by the amount of which the partial tone amplitude is greater than the threshold for the partial tone. If the partial tone amplitude is less than or equal to the threshold for the partial tone, the gain will be zero. The resulting gain spectrum 535 is then sent to the controller 710. In one embodiment, the amplitude spectrum 515 is the audio signal 210 described in FIG. 2 above. In one embodiment, the threshold spectrum 530 is the buzz reduction threshold curve 220 described in relation to FIGS. 2 and 3 above.

The filter bank 720 is an array of band-pass filters that separates the input audio signal into multiple channels, each one carrying a single frequency sub-band of the original audio signal. In one embodiment, each channel or the filter bank 720 contains one or more partial tones of the audio signal. The controller 710 controls the channel gains of the filter bank 720 in order to limit the amplitude of partial tones. As illustrated in FIG. 7, buzz reduction of the audio signal is done in the time domain. The transformation of the audio signal to the frequency domain facilitates a comparison of the audio signal to the buzz reduction threshold curve. The result of the comparison is provided to the controller 710 so that the controller can control the filter bank 720 to perform buzz reduction of the audio signal in the time domain. The latency of the buzz reduction module 130 is determined by the filter bank 720.

The buzz reduction module 130 was described above for one embodiment of the invention. One of ordinary skill in the art will realize that in other embodiments, this module can be implemented differently. For instance, in one embodiment described above, certain modules are implemented as software modules for example to be executed by an application processor or a system-on-chip (SoC). However, in another embodiment, some or all of the modules might be implemented by hardware or programmable logic gates, which can be dedicated application specific hardware (e.g., an ASIC chip or component) or a general purpose chip (e.g., a microprocessor or FPGA).

Figure 8:
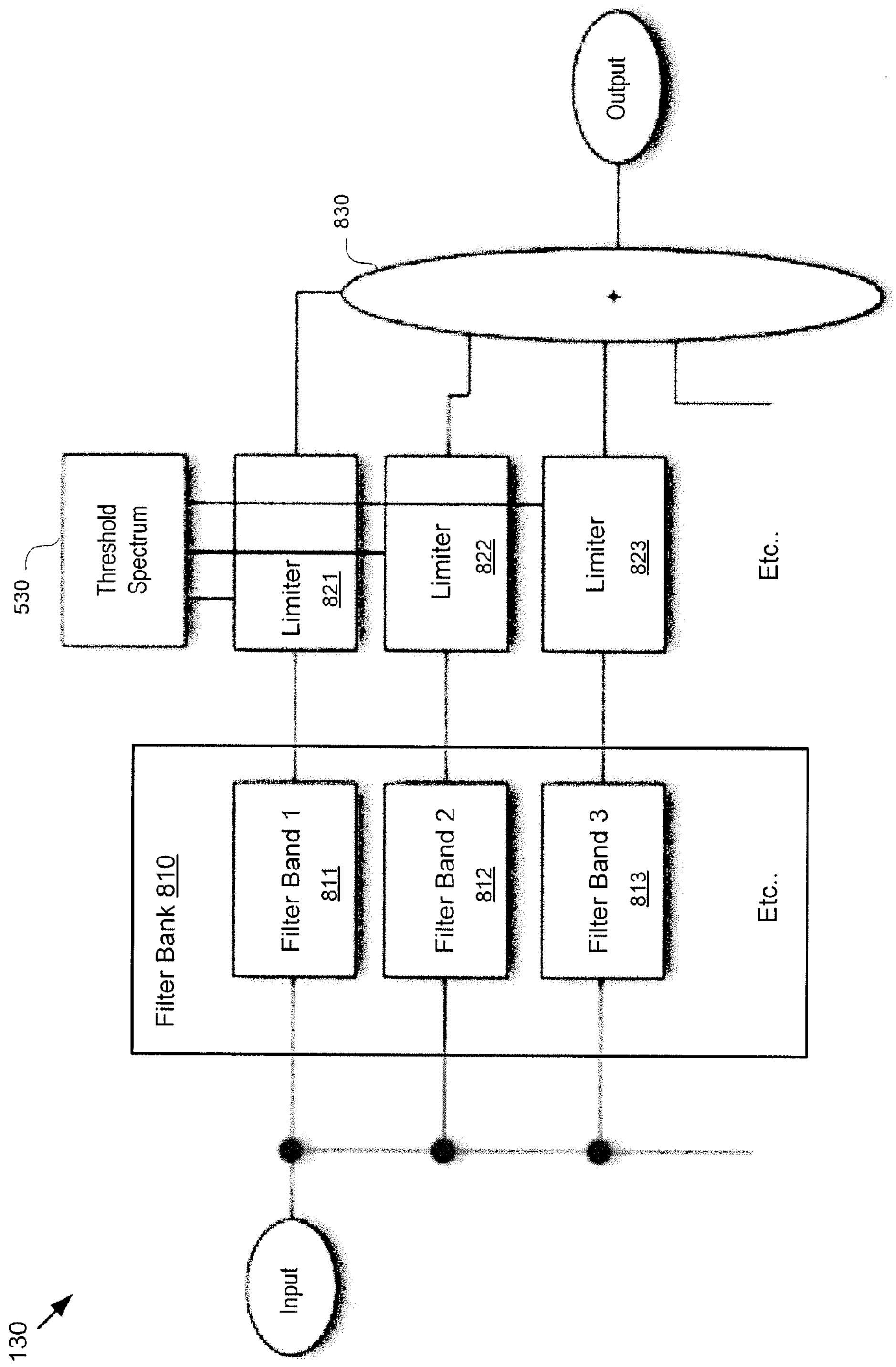
FIG. 8 illustrates a block diagram of a buzz reduction module of one embodiment that uses an adaptive filter bank.

FIG. 8 illustrates a block diagram of a buzz reduction module 130 of one embodiment that uses an adaptive filter bank. In one embodiment, the buzz reduction module 130 is part of the device 100 described in FIG. 1 above. As illustrated in FIG. 8, the buzz reduction module 130 includes a filter bank 810, several limiters 820-822, and a band combiner 830.

The filter bank 810 is an array of band-pass filters that separates the input audio signal into multiple channels, each one carrying a single frequency sub-band of the original audio signal. In one embodiment, each channel of the filter bank 810 contains one or more partial tones of the audio signal. The filter bank 810 includes a filter for each channel. For example, filter 811 is for band/channel 1, filter 812 is for band/channel 2, and filter 813 is for band/channel 3, and so on.

In one embodiment, the filters in the filter bank 810 are adaptive, which means that each narrow band filter tries to 'catch' one or more partial tones and reduce the level of the partial tones below the buzz threshold. Narrow band adaptive filters can, for example, be constructed by exploiting LPC (linear predictive coding), autocorrelation or PLL (phase locked loop) algorithms.

For each channel of the filter bank 810, there is a corresponding limiter. For example, limiter 821 is for band/channel 1, limiter 822 is for band/channel 2, and limiter 822 is for band/channel 3, and so on. Each limiter is operated by a different threshold which is derived from the threshold spectrum 530. Each limiter limits the channel gains of corresponding channel of the filter bank 810 in order to limit the amplitude of partial tones.

As illustrated in FIG. 8, buzz reduction of the audio signal is done in the time domain and does not require an FFT. Thus the processing latency is reduced. The latency of the buzz reduction module 130 is determined by the filter bank 810 and the limiters 821-823. The outputs of the channels are summed by the band combiner 830. In one embodiment, the threshold spectrum 530 is the buzz reduction threshold curve 220 described in relation to FIGS. 2 and 3 above.

The buzz reduction module 130 was described above for one embodiment of the invention. One of ordinary skill in the art will realize that in other embodiments, this module can be implemented differently. For instance, in one embodiment described above, certain modules are implemented as software modules for example to be executed by an application processor or a system-on-chip (SoC). However, in another embodiment, some or all of the modules might be implemented by hardware or programmable logic gates, which can be dedicated application specific hardware (e.g., an ASIC chip or component) or a general purpose chip (e.g., a microprocessor or FPGA).

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The digital signal processing operations described above, such as buzz reduction, can all be done either entirely by a programmed processor, or portions of them can be separated out and be performed by dedicated hardwired logic circuits.

The foregoing discussion merely describes some exemplary embodiments of the invention. One skilled in the art will readily recognize from such discussion, from the accompanying drawings, and from the claims that various modifications can be made without departing from the spirit and scope of the invention.

What is claimed is:

1. An electronic device for buzz reduction comprising:

a speaker driver that is built onto an enclosure of the device, wherein the speaker driver is to be driven by an audio signal;

a gain stage that is to apply a user preference volume level to the audio signal; and a buzz reduction module having a filter and a controller that process the audio signal after the gain stage has applied the user preference volume level to the audio signal, wherein the filter is to attenuate a frequency component of the audio signal and the controller is to configure the filter to attenuate the frequency component of the audio signal in response to determining that strength of the audio signal at the frequency component exceeds a threshold.

2. The electronic device of claim 1 further comprising a power amplifier that is to amplify the audio signal to a level suitable for driving the speaker driver, wherein the power amplifier is to amplify the audio signal after the audio signal is processed by the buzz reduction module.

3. The electronic device of claim 1 further comprising a forward fast Fourier transform (FFT) block that is to transform the audio signal from time domain to frequency domain to be analyzed by the controller.

4. The electronic device of claim 3, wherein the filter attenuates the frequency component of the audio signal in the time domain, wherein the filter attenuates the frequency component of the audio signal in an amount that is determined by how much the strength of the audio signal at the frequency component exceeds the threshold.

5. The electronic device of claim 1, wherein the filter is part of a filter bank, wherein the frequency component of the audio signal is within a frequency band, wherein each filter of the filter bank processes a respective frequency band.

6. The electronic device of claim 1, wherein the filter is a parametric filter, wherein the parametric filter attenuates only the frequency component, not a surrounding band of the frequency component.

7. The electronic device of claim 1, wherein the filter is idle when the strength of the audio signal at the frequency component of the audio signal does not exceed the threshold.

8. The electronic device of claim 7, wherein the filter can be switched off when idle.

9. The electronic device of claim 7, wherein the filter is to output its input when idle.

10. A method of buzz reduction for an electronic device, the method comprising:

applying, using a gain stage, a user preference volume level to an audio signal;

detecting that strength of a partial tone of the audio signal, to which the user preference volume level has been applied, exceeds a threshold;

configuring a filter to attenuate the partial tone to a level below the threshold; and applying the configured filter to the audio signal to which the user preference volume level has been applied, to attenuate the partial tone in the audio signal.

11. The method of claim 10, wherein the partial tone is attenuated in an amount that is determined by how much the partial tone exceeds the threshold.

12. The method of claim 10, wherein different partial tones have different thresholds.

13. The method of claim 10 further comprising transforming the audio signal from time domain to frequency domain wherein detecting strength of the partial tone of the audio signal is in the frequency domain.

14. The method of claim 10, wherein the partial tone is at a frequency that is an integer multiple of a fundamental frequency.

15. The method of claim 10, wherein the filter is a parametric filter, therein the parametric filter attenuates only the partial tone, not a surrounding band of the partial tone.

16. The method of claim 10, wherein the filter is idle when the strength of the partial tone does not exceed the threshold.

17. The method of claim 10 further comprising configuring a set of filters to attenuate a set of partial tones that are integer multiples of the partial tone.

* * * * *